(12) United States Patent
Karrasch

(10) Patent No.: US 11,959,320 B2
(45) Date of Patent: Apr. 16, 2024

(54) LATCH MECHANISM FOR A GUARD ASSEMBLY OF A PROCESSING MACHINE

(71) Applicant: TE Connectivity Services GmbH, Schaffhausen (CH)

(72) Inventor: Christopher John Karrasch, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 934 days.

(21) Appl. No.: 16/923,727

(22) Filed: Jul. 8, 2020

(65) Prior Publication Data
US 2022/0010603 A1    Jan. 13, 2022

(51) Int. Cl.
E05C 3/00 (2006.01)
E05B 65/06 (2006.01)
E05C 3/12 (2006.01)
F16P 3/10 (2006.01)

(52) U.S. Cl.
CPC ............ *E05C 3/12* (2013.01); *E05B 65/06* (2013.01); *F16P 3/10* (2013.01); *E05Y 2900/608* (2013.01)

(58) Field of Classification Search
CPC .... E05C 3/12; E05B 65/06; F16P 3/10; E05Y 2900/608
See application file for complete search history.

(56) References Cited

U.S. PATENT DOCUMENTS

| 2,268,741 A | | 1/1942 | Dall | |
|---|---|---|---|---|
| 2,542,140 A | * | 2/1951 | Holm | E05F 5/027 292/79 |
| 3,451,702 A | * | 6/1969 | Little | E05C 19/022 292/99 |
| 6,357,803 B1 | * | 3/2002 | Lorek | E05C 19/022 292/99 |
| 9,733,034 B1 | * | 8/2017 | Viani | F41A 19/10 |
| 2011/0168517 A1 | * | 7/2011 | Krieger | E05C 17/50 292/66 |
| 2015/0114051 A1 | * | 4/2015 | Mao | H05K 5/0221 70/57 |
| 2017/0234037 A1 | * | 8/2017 | Cassou | E05B 63/18 292/163 |

FOREIGN PATENT DOCUMENTS

| DE | 202008004173 | * | 8/2009 | ......... E05C 19/008 |
| DE | 202012101107 U1 | | 5/2012 | |
| DE | 202012101107 | * | 7/2012 | ......... E05B 15/021 |
| GB | 2183283 A | | 6/1987 | |

OTHER PUBLICATIONS

International Search Report in PCT/IB2021/056167, dated Oct. 14, 2021, 3 pp.
Abstract of DE202012101107 (U1), May 11, 2012, 1 p.

* cited by examiner

*Primary Examiner* — Daniel J Troy
*Assistant Examiner* — Daniel Alvarez

(57) ABSTRACT

A latch mechanism includes a latch having a first latch protrusion and a second latch protrusion, and a catch having a first catch protrusion and a second catch protrusion. The first catch protrusion engages the first latch protrusion in a first catch position. The second catch protrusion engages the second latch protrusion in a second catch position following release of the first catch position.

17 Claims, 7 Drawing Sheets

LATCH MECHANISM FOR A GUARD ASSEMBLY OF A PROCESSING MACHINE

FIELD OF THE INVENTION

The present invention relates to a guard assembly and, more particularly, to a latch mechanism for a guard assembly.

BACKGROUND

In a processing machine, such as a wire terminator, a guard door is attached to a frame and is rotatable with respect to the frame. An open position of the guard door permits access to an interior of the frame in which a tooling of the processing machine is disposed. A closed position of the guard door prevents an operator from reaching into the interior of the frame and permits the tooling to perform the processing, such as crimping a terminal onto a wire.

A releasable latch mechanism keeps the guard door in the closed position. A spring plunger biases the guard door toward the open position and, when the operator desires to access the interior of the frame, the latch mechanism is released and the guard door is pushed open to the open position by a force of the spring plunger. The force applied by the spring plunger opens the guard door to the open position with a speed that could potentially cause damage to the guard door or injury to the operator.

SUMMARY

A latch mechanism includes a latch having a first latch protrusion and a second latch protrusion, and a catch having a first catch protrusion and a second catch protrusion. The first catch protrusion engages the first latch protrusion in a first catch position. The second catch protrusion engages the second latch protrusion in a second catch position following release of the first catch position.

BRIEF DESCRIPTION OF THE DRAWINGS

The invention will now be described by way of example with reference to the accompanying Figures, of which.

DETAILED DESCRIPTION OF THE EMBODIMENTS

Figure 1:
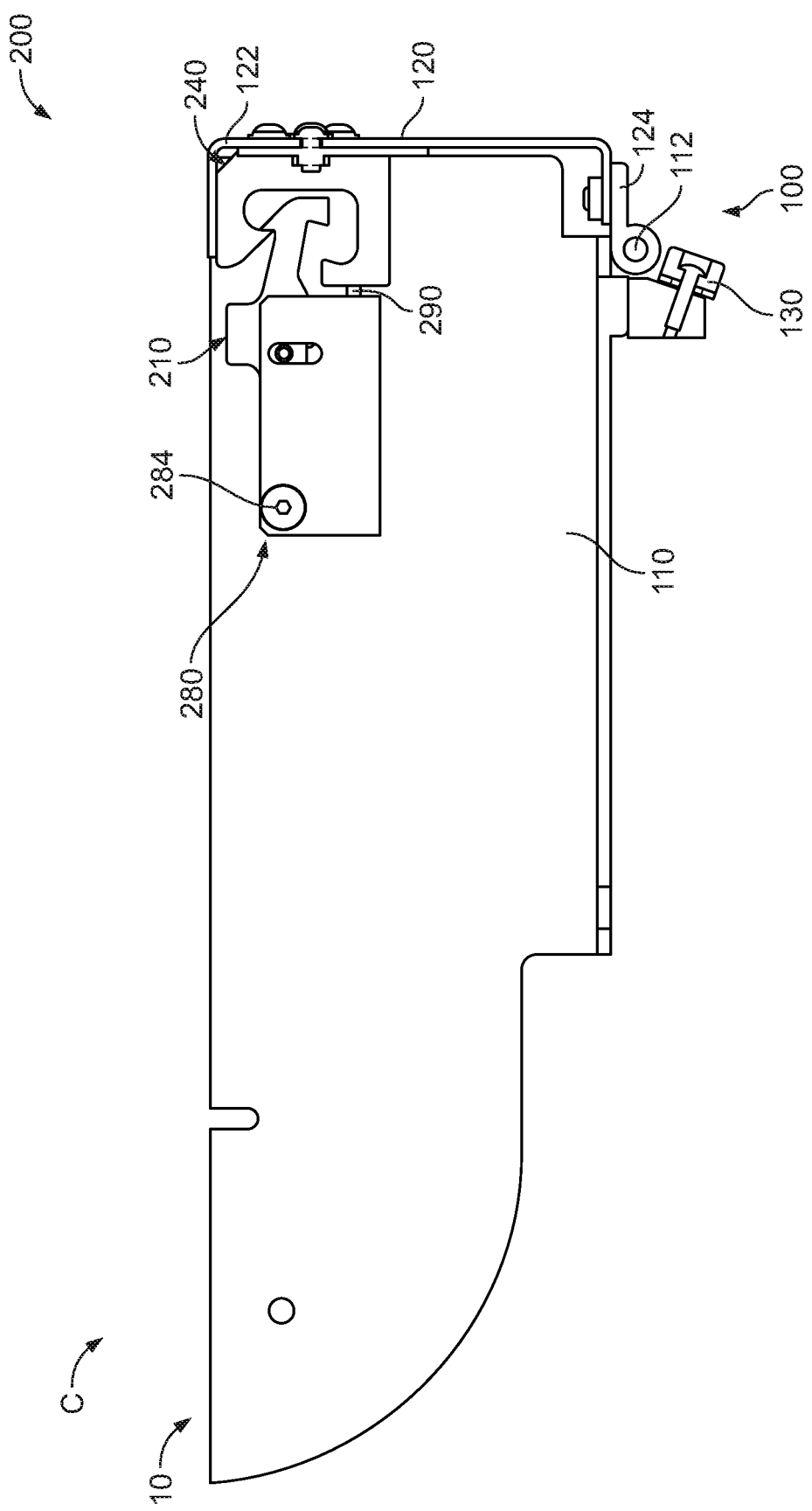
FIG. 1 is a side view of a guard assembly according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

A guard assembly 10 according to an embodiment, as shown in FIG. 1, comprises a guard 100 and a latch mechanism 200 attached to the guard 100. The latch mechanism 200 is shown securing the guard 100 in a closed position C in FIG. 1.

The guard 100, as shown in FIG. 1, includes a fixed portion 110 and a door 120. The fixed portion 110 has a hinge 112. The door 120 has a first end 122 and an opposite second end 124. The second end 124 is attached to the hinge 112 and the door 120 is rotatable about the hinge 112 with respect to the fixed portion 110 between the closed position C and an open position O shown in FIG. 7. The guard 100 includes a stop 130. In an embodiment, the stop 130 is made of a rubber material.

The latch mechanism 200, as shown in FIG. 1, includes a latch 210, a catch 240 engaging with the latch 210, a holder 280 holding the latch 210, and a plunger 290 disposed in and extending from the holder 280. In the embodiment shown in FIG. 1, the latch 210 is monolithically formed in a single piece and the catch 240 is monolithically formed in a single piece.

Figure 2:
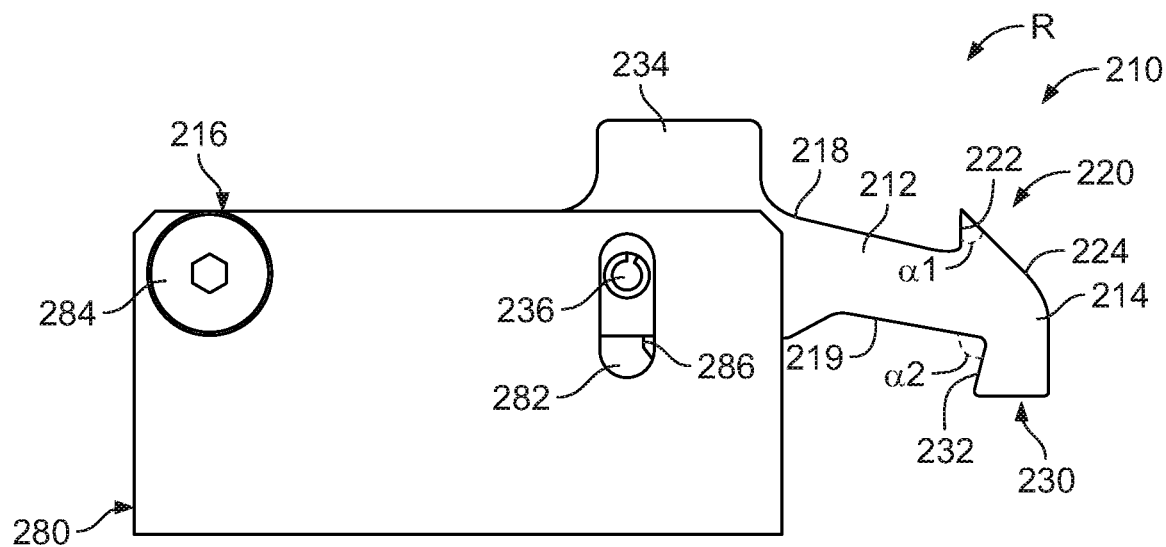
FIG. 2 is a side view of a latch of the guard assembly.
Figure 3:
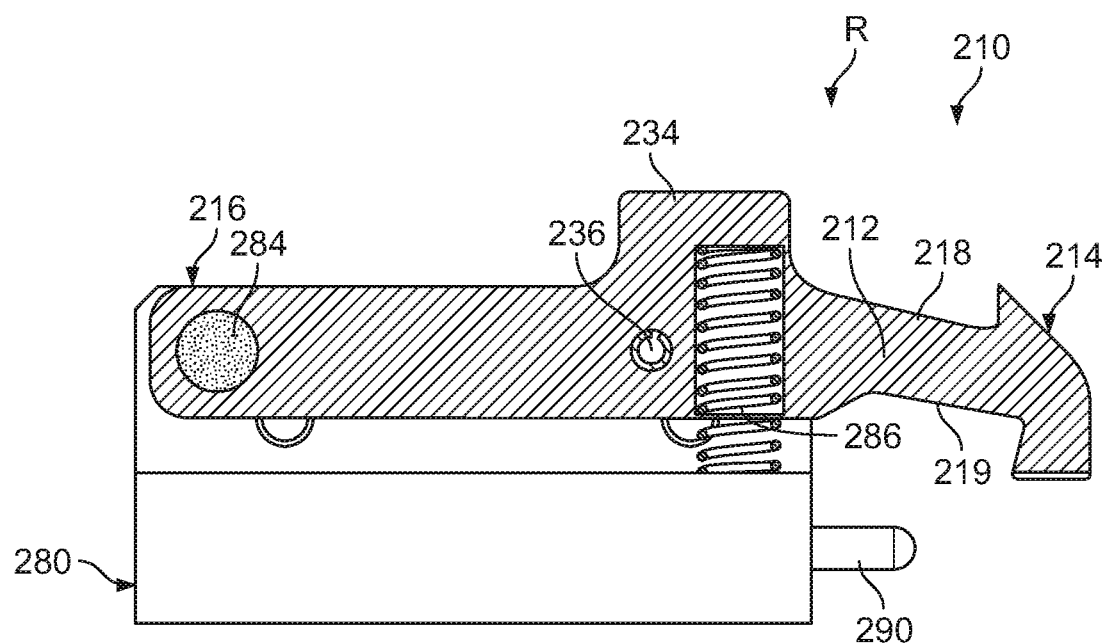
FIG. 3 is a sectional side view of the latch.

The latch 210, as shown in FIGS. 2 and 3, has a bar 212 with a first end 214, a second end 216 opposite the first end 214, an upper surface 218, and a lower surface 219 opposite the upper surface 218. The latch 210 has a first latch protrusion 220 extending from the upper surface 218 and a second latch protrusion 230 extending from the lower surface 219.

The first latch protrusion 220 has a latch flat side 222 and a latch sloped side 224 opposite the latch flat side 222, as shown in FIG. 2. The latch flat side 222 extends approximately perpendicularly with respect to the upper surface 218. The latch sloped side 224 extends at an angle with respect to the latch flat side 222. In the shown embodiment, the latch flat side 222 and the latch sloped side 224 form a first acute angle α1 between them.

The second latch protrusion 230 has a latch angled side 232, as shown in FIG. 2. The latch angled side 232 faces in a same direction as the latch flat side 222; a direction toward the second end 216 of the bar 212. The latch angled side 232 extends at an angle with respect to the lower surface 219. In the shown embodiment, the latch angled side 232 extends at a second acute angle α2 with respect to the lower surface 219.

The latch 210, as shown in FIGS. 2 and 3, has a press element 234 and a peg 236 extending from the bar 212 at a position between the first end 214 and the second end 216. The press element 234 extends from the upper surface 218 and, in the shown embodiment, is approximately rectangular. In other embodiments, the press element 234 could be any other shape that extends from the bar 212 to permit pressing by a user, as described in greater detail below. The peg 236 extends from the bar 212 in a direction perpendicular to the first latch protrusion 220, the second latch protrusion 230, and the press element 234.

Figure 4:
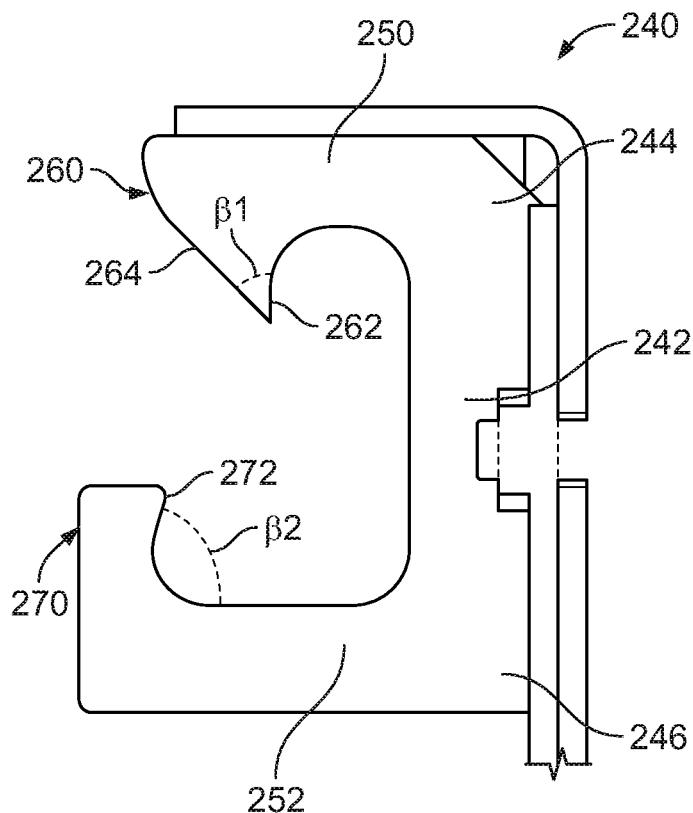
FIG. 4 is a side view of a catch of the guard assembly.

As shown in FIG. 4, the catch 240 has a base 242, a first leg 250 extending from the base 242, and a second leg 252 extending from the base 242. The base 242 has an upper end 244 and a lower end 246 opposite the upper end 244. The first leg 250 extends from the upper end 244 and the second leg 252 extends from the lower end 246. The catch 240 has a first catch protrusion 260 at an end of the first leg 250 opposite the base 242 and a second catch protrusion 270 at an end of the second leg 252 opposite the base 242.

The first catch protrusion 260 has a catch flat side 262 and a catch sloped side 264 opposite the catch flat side 262, as shown in FIG. 4. The catch flat side 262 extends approximately perpendicularly with respect to the first leg 250. The catch sloped side 264 extends at an angle with respect to the catch flat side 262. In the shown embodiment, the catch flat side 262 and the catch sloped side 264 form a third acute angle β1 between them.

The second catch protrusion 270 has a catch angled side 272, as shown in FIG. 4. The catch angled side 272 faces in a same direction as the catch flat side 262; a direction toward the base 242 of the catch 240. The catch angled side 272 extends at an angle with respect to the second leg 252. In the shown embodiment, the catch angled side 272 extends at a fourth acute angle β2 with respect to the second leg 252.

The holder 280, as shown in FIGS. 1-3, is disposed adjacent to the bar 212 and extends from the second end 216 to the press element 234. The holder 280 includes a passageway 282 extending through the holder 280, a fastener 284 securing the holder 280 to the second end 216 of the bar 212, and a spring 286 disposed within the holder 280.

To form the guard assembly 10, as shown in FIG. 1, the latch mechanism 200 is attached to the guard 100. The fastener 284 attaches the holder 280 and the latch 210 to the fixed portion 110. The catch 240 is attached to the first end 122 of the door 120.

The operation of the guard assembly 10, including the engagement of the latch 210 with the catch 240, will now be described in greater detail primarily with reference to FIGS. 5A-5B.

Figure 5A:
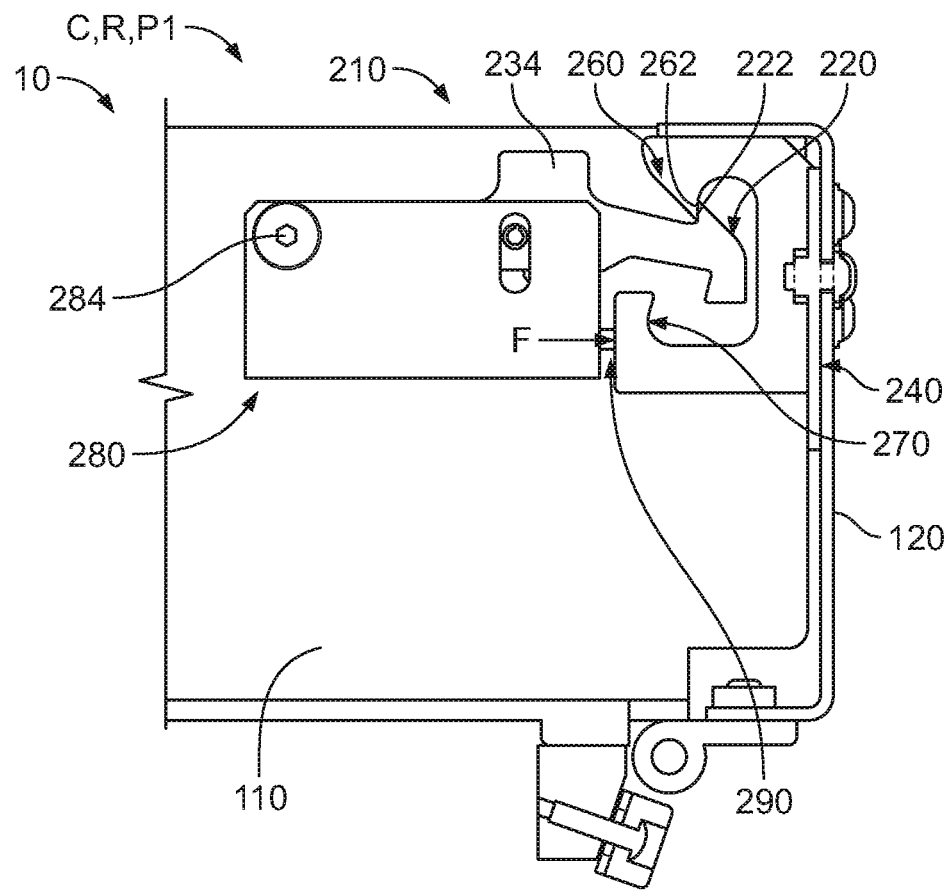
FIG. 5A is a side view of the guard assembly in a closed position and a first catch position.

The latch mechanism 200 is shown in a first catch position P1 in FIG. 5A. The first catch position P1, as shown in FIGS. 1 and 5A, corresponds to the closed position C of the door 120 with respect to the fixed portion 110. The first latch protrusion 220 engages the first catch protrusion 260 in the first catch position P1, with the latch flat side 222 engaging the catch flat side 262.

In the first catch position P1 shown in FIG. 5A, the plunger 290 is elastically compressed within the holder 280 by the catch 240 and abuts a portion of the catch 240 at the second catch protrusion 270. The elastic compression of the plunger 290 applies a plunger force F on the catch 240 urging the catch 240 in a direction away from the latch 210 in the first catch position P1. The engagement of the first latch protrusion 220 with the first catch protrusion 260 holds the latch mechanism 200 in the first catch position P1 despite the plunger force F applied to the catch 240.

Figure 5B:
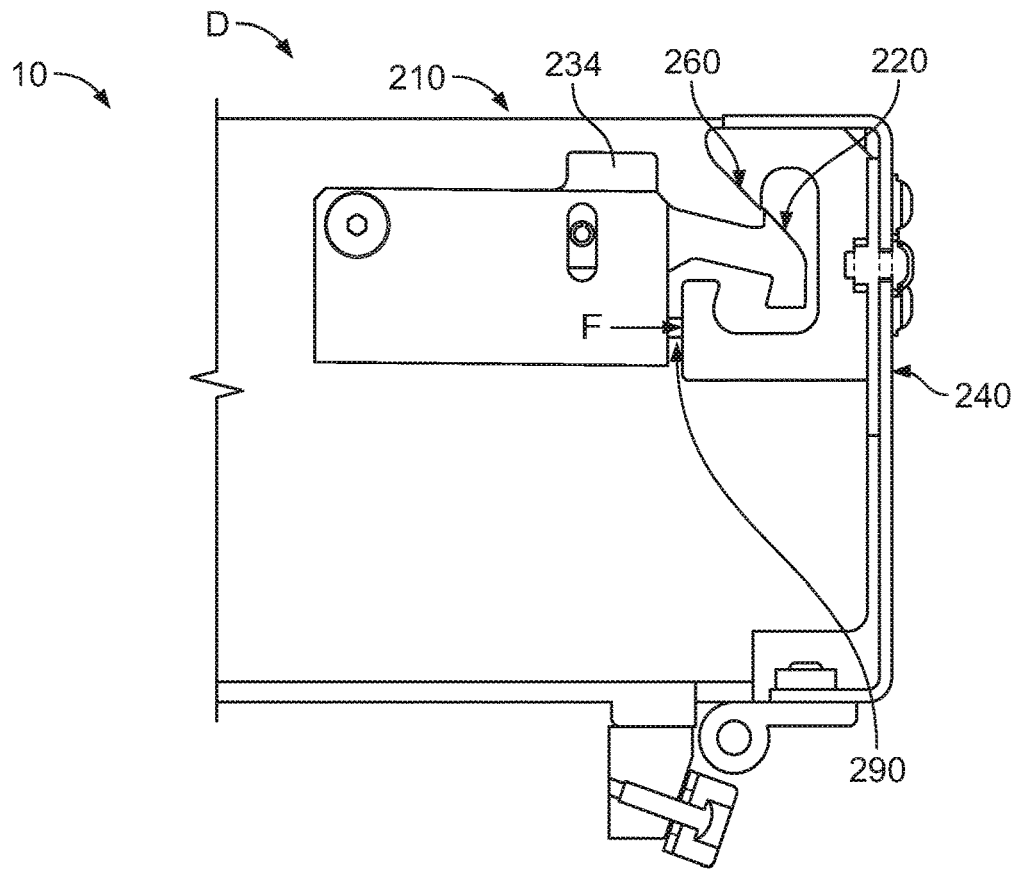
FIG. 5B is a side view of the guard assembly with the latch in a depressed position.
Figure 5C:
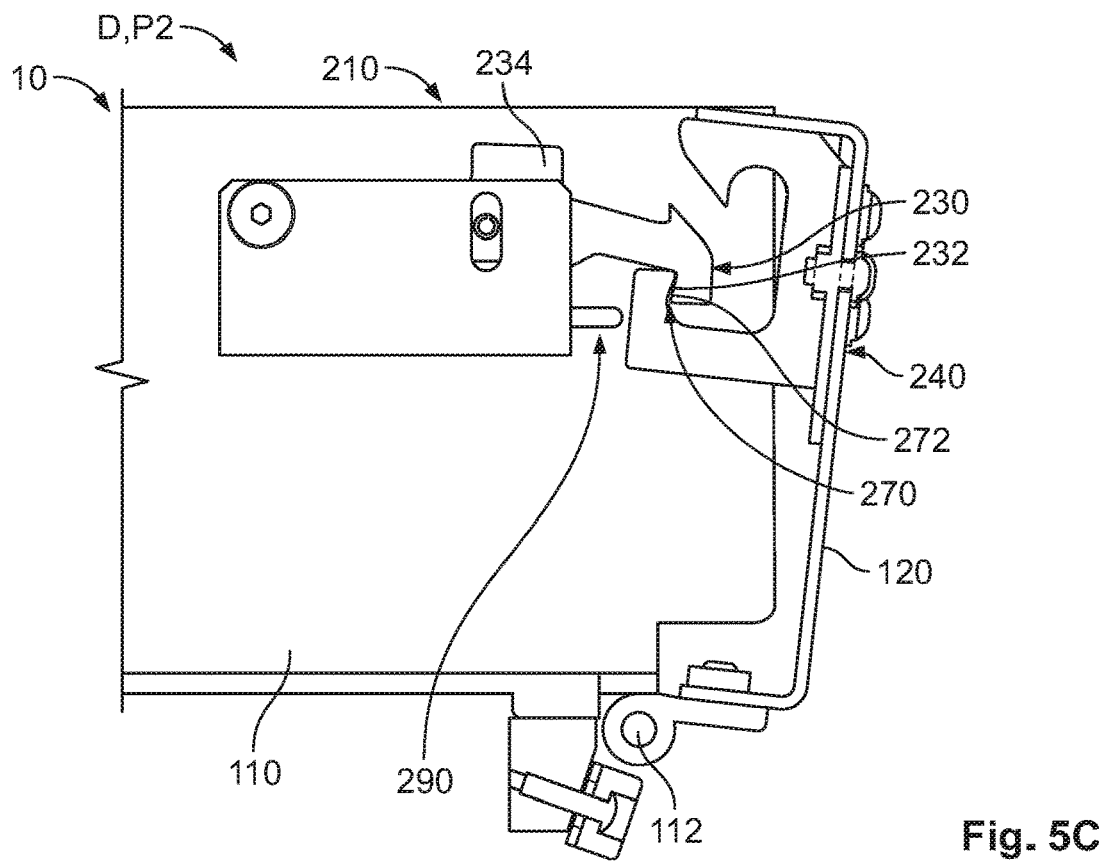
FIG. 5C is a side view of the guard assembly in a second catch position.

The latch 210 is pivotable with respect to the holder 280 and the fixed portion 110 about the fastener 284 at the second end 216 between a released position R, shown in FIGS. 2, 3, 5A, and 5D, and a depressed position D shown in FIGS. 5B and 5C. The spring 286 shown in FIG. 3 biases the latch 210 toward the released position R. The peg 236 extends through the passageway 282 and moves in the passageway 282 between the released position R and the depressed position D, limiting a maximum movement of the latch 210 with respect to the holder 280 and the fixed portion 110 between the released position R and the depressed position D.

A depression of the press element 234, for example by an operator's finger, pivots the latch 210 from the released position R shown in FIG. 5A to the depressed position D shown in FIGS. 5B and 5C. The pivoting of the latch 210 toward the depressed position D releases the first catch position P1 engagement of the first latch protrusion 220 and the first catch protrusion 260, as shown in FIG. 5B. The latch flat side 222 moves off of the catch flat side 262 and, at the initial release of this engagement shown in FIG. 5B, the latch 210 is not in engagement with the catch 240.

The plunger 290 abutting the catch 240 continues to apply the plunger force F at the initial release shown in FIG. 5B, moving the catch 240 away from the latch 210. The movement of the catch 240 away from the latch 210 rotates the door 120 about the hinge 112 and away from the fixed portion 110, as shown in FIG. 5C. While the press element 234 remains depressed and the latch 210 remains in the depressed position D, the catch 240 moves away from the latch 210 until the catch 240 re-engages the latch 210 in a second catch position P2 shown in FIG. 5C. In the second catch position P2, following release of the first catch position P1, the second latch protrusion 230 engages the second catch protrusion 270. The catch angled side 272 engages the latch angled side 232 in the second catch position P2.

A single depression of the press element 234 releases the first catch position P1 and engages the second catch position P2. The plunger force F is applied on the catch 240 and urges the door 120 away from the fixed portion 110 between the first catch position P1 and the second catch position P2, moving the door 120 out of the closed position C and toward the open position O; the second catch position P2 is between the closed position C and the open position O. The plunger 290 does not apply the plunger force F on the catch 240 in the second catch position P2, as shown in FIG. 5C.

Figure 5D:
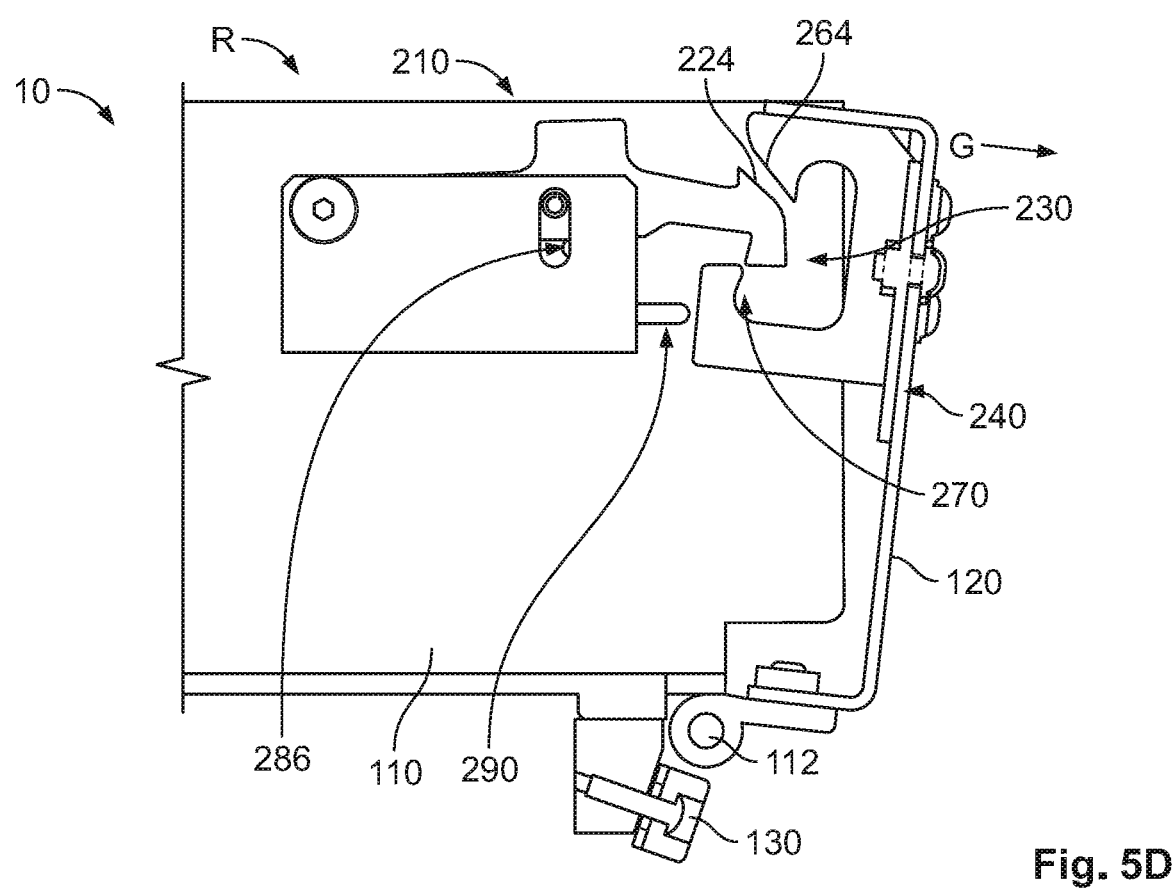
FIG. 5D is a side view of the guard assembly with the latch in a released position.

From the second catch position P2 shown in FIG. 5C, the depression of the press element 234 is released and the spring 286 moves the latch 210 back to the released position R shown in FIG. 5D. In movement from the second catch position P2 back to the released position R, the second latch protrusion 230 disengages from the second catch protrusion 270, releasing the second catch position P2.

Following release of the second catch position P2, as shown in FIG. 5D, the latch 210 is not in engagement with the catch 240. The plunger 290 does not apply the plunger force F on the catch 240 at the release of the second catch position P2. The door 120, under only a gravitational force G, rotates about the hinge 112 from the release of the second catch position P2 toward the stop 130 and the open position O shown in FIG. 7. The door 120 abuts the stop 130 in the open position O.

To move the door 120 back to the closed position C shown in FIG. 5A, an operator rotates the door 120 about the hinge 112 back toward the fixed portion 110. From the position shown in FIG. 5D, the catch sloped side 264 contacts the latch sloped side 224 and the engagement of the sloped sides 224, 264 pivots the latch 210 toward the depressed position D against the bias of the spring 286. After the first catch protrusion 260 passes the first latch protrusion 220, in the position shown in FIG. 5B, the spring 286 pivots the latch 210 back to the released position R, returning the latch mechanism 200 to the first catch position P1 and the door 120 to the closed position C shown in FIG. 5A. If the first catch protrusion 260 does not fully engage the first latch protrusion 220, the plunger force F from the plunger 290 pushes the door 120 back toward the open position O.

Figure 6:
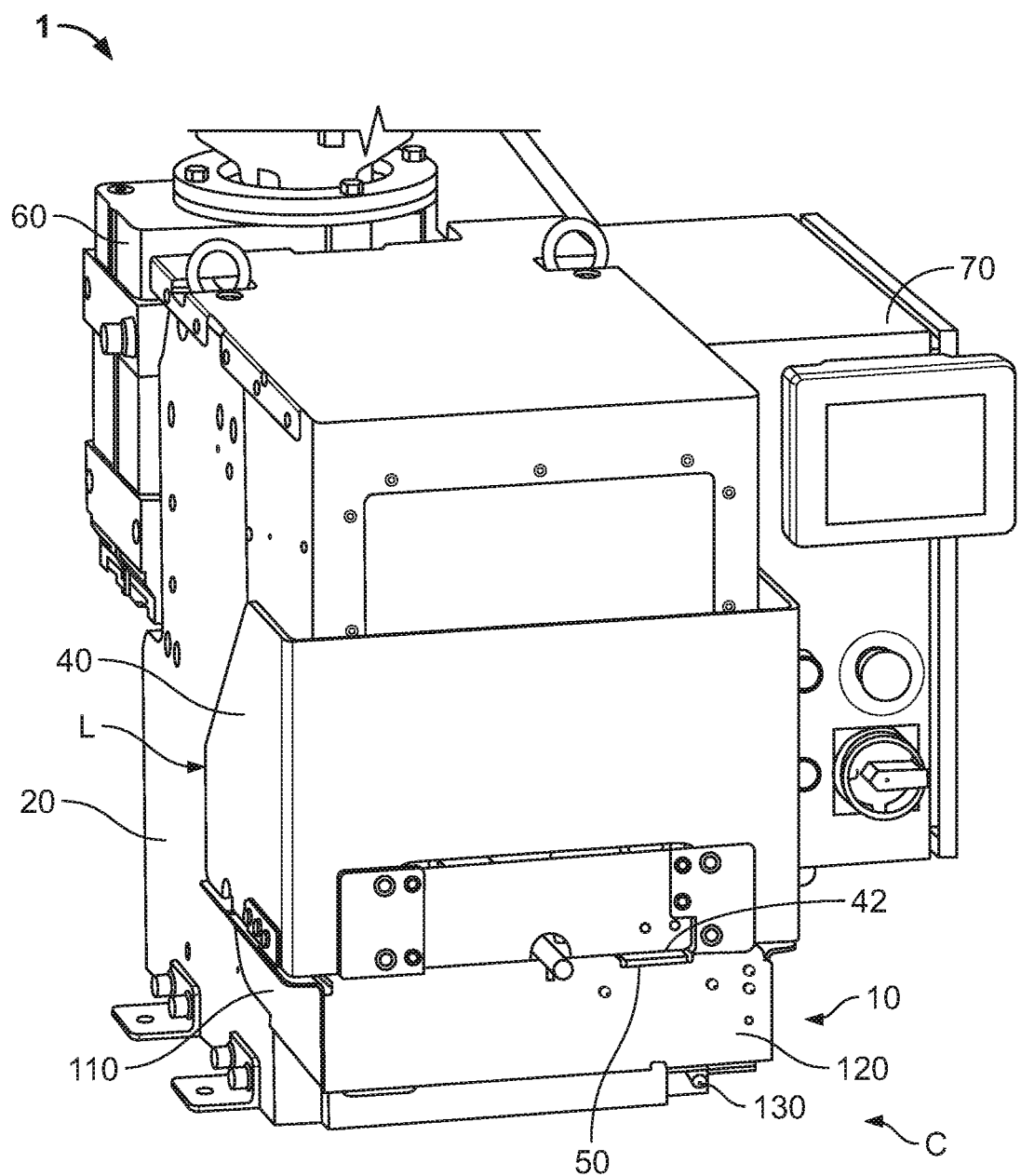
FIG. 6 is a perspective view of a processing machine according to an embodiment with a guard assembly in a closed position and a shield in a lower position.
Figure 7:
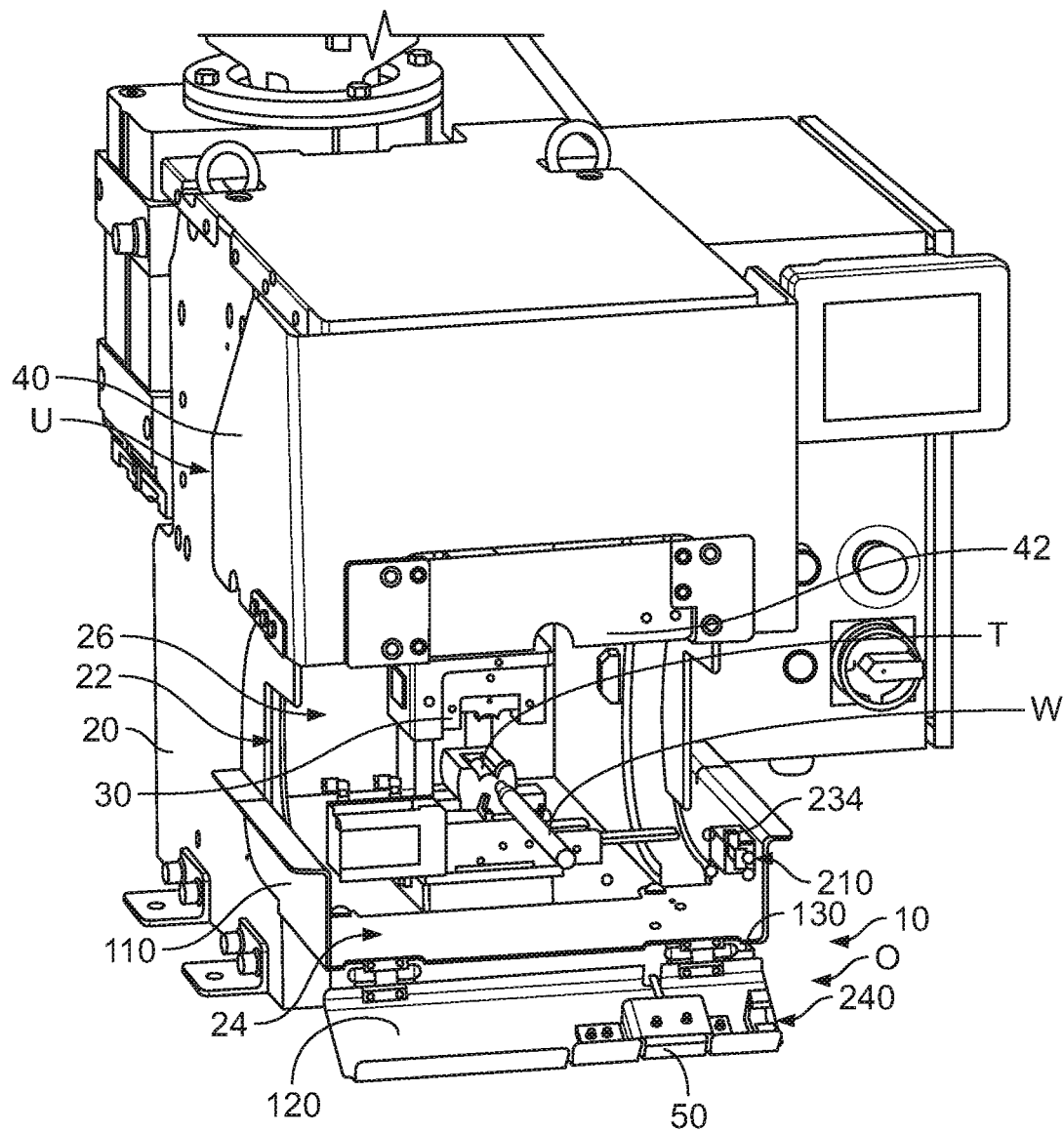
FIG. 7 is a perspective view of the processing machine with the guard assembly in an open position and the shield in an upper position.

A processing machine 1 according to an embodiment, as shown in FIGS. 6 and 7, comprises the guard assembly 10 described in detail above, a frame 20 to which the guard assembly 10 is attached, a tooling 30 disposed in the frame 20, a shield 40 mounted to the frame 20, a safety switch 50 mounted on the door 120, a power supply 60, and a control unit 70 connected to the tooling 30, the safety switch 50, and the power supply 60. In an embodiment, the processing machine 1 is a wire terminator for terminating, for example crimping, a terminal T onto an end of a wire W.

The frame 20, as shown in FIG. 7, defines a work area 22 including a guard portion 24 and a shield portion 26. The tooling 30 is disposed in the work area 22.

The shield 40 is slidable with respect to the frame 20 between a lower position L enclosing the shield portion 26, shown in FIG. 6, and an upper position U exposing the shield portion 26, shown in FIG. 7. The shield 40 has a safety switch actuator 42 disposed on a bottom of the shield 40.

As shown in FIGS. 6 and 7, the fixed portion 110 is attached to the frame 20. In the closed position C, shown in FIG. 6, the door 120 encloses the guard portion 24 of the work area 22. In the open position O, shown in FIG. 7, the door 120 exposes the guard portion 24 of the work area 22. As shown in FIG. 7, the latch 210 is attached to the fixed portion 110 and the catch 240 is attached to the door 120, as described in detail above with respect to FIGS. 1 and 5A-5D.

The processing machine 1 is operated with the shield 40 in the lower position L and the door 120 in the closed position C, as shown in FIG. 6. The safety switch actuator 42 of the shield 40 actuates the safety switch 50 on the door 120 when the shield 40 is in the lower position L and the door 120 is in the closed position C. The control unit 70 receives an actuation signal representing an actuation of the safety switch 50 and permits activation of the tooling 30, disposed in the enclosed work area 22, with the power supply 60. In the shown embodiment, the activation of the tooling 30 crimps the terminal T onto the wire W. Both the shield 40 must be in the lower position L and the door 120 must be in the closed position C to permit activation of the tooling 30.

To remove the pieces processed by the tooling 30, for example the terminal T crimped to the wire W, the shield is moved to the upper position U shown in FIG. 7. The pieces processed by the tooling 30 can then be interchanged for similar processing of additional pieces.

To change the tooling 30 of the processing machine 1, the door 120 must be moved to the open position O shown in FIG. 7. Due to the engagements of the latch 210 with the catch 240 described in detail with respect to FIGS. 5A-5B, when the operator presses the press element 234, the door 120 only rotates under the plunger force F from the closed position C to the second catch position P2. The release of the press element 234 then allows the door 120 to fall to the open position O abutting the stop 130 only under the gravitational force G; without the additional plunger force F applied by the plunger 290. The multiple catch positions P1, P2 operated by a single depression of the press element 234 prevent the door 120 from opening too quickly or forcefully, limiting a contact force of the door 120 with the operator or another object that could cause injury or damage.

What is claimed is:

1. A latch mechanism, comprising:
    a latch having a first latch protrusion and a second latch protrusion;
    a catch having a first catch protrusion and a second catch protrusion, the first catch protrusion engaging the first latch protrusion in a first catch position, the second catch protrusion engaging the second latch protrusion in a second catch position following release of the first catch position; and
    a plunger applying a plunger force on the catch urging the catch in a direction away from the latch in the first catch position, the plunger does not apply the plunger force on the catch in the second catch position.

2. The latch mechanism of claim 1, wherein the latch is monolithically formed in a single piece and the catch is monolithically formed in a single piece.

3. The latch mechanism of claim 1, wherein the latch has a bar, the first latch protrusion extending from an upper surface of the bar and the second latch protrusion extending from a lower surface of the bar.

4. The latch mechanism of claim 3, wherein the catch has a base with a first leg and a second leg extending from the base.

5. The latch mechanism of claim 4, wherein the first catch protrusion is positioned at an end of the first leg opposite the base and the second catch protrusion is positioned at an end of the second leg opposite the base.

6. The latch mechanism of claim 1, wherein the first latch protrusion has a latch flat side and a latch sloped side opposite the latch flat side and the first catch protrusion has a catch flat side and a catch sloped side opposite the catch flat side, the latch flat side engages the catch flat side in the first catch position.

7. The latch mechanism of claim 6, wherein the second latch protrusion has a latch angled side facing in a same direction as the latch flat side, the second catch protrusion has a catch angled side engaging the latch angled side in the second catch position.

8. The latch mechanism of claim 1, wherein the latch has a press element, a depression of the press element releases the first catch position and engages the second catch position.

9. The latch mechanism of claim 8, wherein a release of the depression of the press element releases the second catch position.

10. A guard assembly, comprising:
    a guard including a fixed portion and a door, the door is attached to a hinge of the fixed portion and is rotatable with respect to the fixed portion between a closed position and an open position; and
    a latch mechanism including a latch attached to the fixed portion and a catch attached to the door, the latch has a first latch protrusion and a second latch protrusion and the catch has a first catch protrusion and a second catch protrusion, the first catch protrusion engages the first latch protrusion in a first catch position corresponding to the closed position of the door, the second catch protrusion engages the second latch protrusion in a second catch position following release of the first catch position, the latch mechanism includes a plunger applying a plunger force on the catch urging the door in a direction away from the fixed portion in the first catch position, the plunger does not apply a plunger force on the catch in the second catch position.

11. The guard assembly of claim 10, wherein the second catch position is between the open position and the closed position.

12. The guard assembly of claim 11, wherein the door reaches the open position abutting a stop following release of the second catch position.

13. The guard assembly of claim 12, wherein the latch has a press element, a depression of the press element releases the first catch position and engages the second catch position, a release of the depression of the press element releases the second catch position.

14. The guard assembly of claim 10, wherein only a gravitational force moves the door to the open position upon release of the second catch position.

15. A processing machine, comprising:
a frame defining a work area; and
a guard assembly including a guard and a latch mechanism, the guard has a fixed portion attached to the frame and a door attached to a hinge of the fixed portion, the door is rotatable with respect to the fixed portion between a closed position enclosing a guard portion of the work area and an open position exposing the guard portion of the work area, the latch mechanism has a latch attached to the fixed portion and a catch attached to the door, the latch has a first latch protrusion and a second latch protrusion and the catch has a first catch protrusion and a second catch protrusion, the first catch protrusion engages the first latch protrusion in a first catch position corresponding to the closed position, the second catch protrusion engages the second latch protrusion in a second catch position following release of the first catch position, the latch mechanism includes a plunger applying a plunger force on the catch urging the door in a direction away from the fixed portion in the first catch position, the plunger does not apply a plunger force on the catch in the second catch position.

16. The processing machine of claim 15, further comprising a shield mounted to the frame, the shield is slidable with respect to the frame between a lower position enclosing a shield portion of the work area and an upper position exposing the shield portion of the work area.

17. The processing machine of claim 16, further comprising a safety switch mounted on the door, the shield has a safety switch actuator actuating the safety switch in the closed position of the door and the lower position of the shield, permitting activation of a tooling disposed in the work area.

* * * * *